United States Patent
Toma et al.

(10) Patent No.: US 10,448,033 B2
(45) Date of Patent: Oct. 15, 2019

(54) TRANSMITTING METHOD AND RECEIVING METHOD

(71) Applicant: Panasonic Intellectual Property Corporation of America, Torrance, CA (US)

(72) Inventors: Tadamasa Toma, Osaka (JP); Noritaka Iguchi, Osaka (JP); Takahiro Nishi, Nara (JP); Hisaya Katou, Kyoto (JP)

(73) Assignee: SUN PATENT TRUST, New York, NY (US)

( * ) Notice: Subject to any disclaimer, the term of this patent is extended or adjusted under 35 U.S.C. 154(b) by 706 days.

(21) Appl. No.: 14/943,068

(22) Filed: Nov. 17, 2015

(65) Prior Publication Data

US 2016/0073119 A1     Mar. 10, 2016

Related U.S. Application Data

(63) Continuation of application No. PCT/JP2014/003193, filed on Jun. 16, 2014.
(Continued)

(30) Foreign Application Priority Data

Jun. 4, 2014 (JP) .................................. 2014-116098

(51) Int. Cl.
  *H04N 19/30* (2014.01)
  *H04N 19/187* (2014.01)
  (Continued)

(52) U.S. Cl.
  CPC ............. *H04N 19/30* (2014.11); *H04N 19/70* (2014.11); *H04N 21/236* (2013.01); *H04N 21/242* (2013.01)

(58) Field of Classification Search
  CPC ...... H04N 19/30; H04N 19/70; H04N 21/236; H04N 21/242
  (Continued)

(56) References Cited

U.S. PATENT DOCUMENTS 5,886,736 A * 3/1999 Chen ..................... G06T 9/004
  348/42
6,075,576 A   6/2000 Tan et al.
(Continued)

FOREIGN PATENT DOCUMENTS

JP   2005-527138   9/2005
JP   2005-530462   10/2005
(Continued)

OTHER PUBLICATIONS

Demos, G., "Temporal and resolution layering in advanced television", SPIED, Feb. 16, 1996, vol. 2663, pp. 52-68.
(Continued)

*Primary Examiner* — Matthew K Kwan
(74) *Attorney, Agent, or Firm* — Wenderoth, Lind & Ponack, L.L.P.

(57) ABSTRACT

A transmitting method for transmitting encoded data obtained by hierarchically encoding a video image includes: generating an encoded stream that includes time information and the encoded data, the time information indicating a time at which decoding or displaying processing of the encoded data is performed, and transmitting the generated encoded stream, wherein the encoded data includes a plurality of sets each including a plurality of access units and the time information includes first time information which indicates a time at which the processing performed on a first access unit of the first set is performed and which is based on a reference clock, and second time information used to specify a time at which the processing performed on a second access (Continued)

unit of the second set is performed and which is based on the reference clock.

22 Claims, 15 Drawing Sheets

Related U.S. Application Data

(60) Provisional application No. 61/836,291, filed on Jun. 18, 2013.

(51) Int. Cl.
*H04N 21/236* (2011.01)
*H04N 21/242* (2011.01)
*H04N 19/70* (2014.01)

(58) Field of Classification Search
USPC .................................................. 375/240.02
See application file for complete search history.

(56) References Cited

U.S. PATENT DOCUMENTS

| | | | |
|---|---|---|---|
| 2006/0136440 | A1 | 6/2006 | Cotarmanac'h |
| 2007/0291836 | A1 | 12/2007 | Shi et al. |
| 2009/0006927 | A1 | 1/2009 | Sayadi et al. |
| 2009/0031038 | A1 | 1/2009 | Shukla et al. |
| 2010/0202759 | A1* | 8/2010 | Sasaki .............. G11B 20/10527 386/212 |
| 2011/0119395 | A1* | 5/2011 | Ha ..................... H04L 47/2416 709/231 |
| 2012/0099656 | A1 | 4/2012 | Ohya et al. |
| 2018/0227626 | A1 | 8/2018 | Nakazawa et al. |

FOREIGN PATENT DOCUMENTS

| | | |
|---|---|---|
| JP | 2009-537081 | 10/2009 |
| JP | 2010-530196 | 9/2010 |
| WO | 2004/012455 | 2/2004 |
| WO | 2013/067033 | 5/2013 |
| WO | 2017/061070 | 4/2017 |

OTHER PUBLICATIONS

Takahiro Michi, "Special Feature 2, Introduction to Video and Audio Processing, Chapter 3", Software Design, Jan. 2011, Gijutsu-Hyohron Co., Ltd., with partial English translation.

Rao et al., translation supervised by Yasuda et al., "Information Compression Technique for Digital Broadcasting and the Internet", 1st edition, Jun. 10, 1999, Kyoritsu Shuppan Co., Ltd., with partial English translation.

Supervised by Hiroshi Fujiwara, "Latest MPEG Textbook", 1st edition, Aug. 1, 1994, ASCII Corporation, with partial English translation.

"ISO/IEC 13818-1:2013(E)", Fourth edition, Jun. 15, 2013, ISO/IEC, p. 153-161 (Annex B).

"ISO/IEC FDIS 21000-7:2007(E)", Final Draft, Nov. 8, 2007, ISO/IEC, p. 161-178.

Youngkwon Lim, "Review of w11792", [online], Mar. 20, 2011, AHG on MMT, URL:http://phenix.it-sudparis.eu/jct/doc_end_user/documents/5_Geneva/wg11/JCTVCE360-v3 -.zip.

Takahiro Michi, "Special Feature 2, Introduction to Video and Audio Processing, Chapter 4", Software Design, Jan. 2011, Gijutsu-Hyohron Co., Ltd., with partial English translation.

International Search Report of PCT application No. PCT/JP2014/003193 dated Sep. 16, 2014.

"Information technology—High efficiency coding and media delivery in heterogeneous environments—Part1:MPEG media transport(MMT)" ISO/IEC FDIS 23008-1, 2013.

Extended European Search Report dated May 9, 2016 in corresponding European Patent Application No. 14813558.5.

Seong-Jun Bae et al: "Proposed M-Unit Structure for Media Stream Containing AUs with Multiple Media Fragment Units", 99. MPEG Meeting; Feb. 6, 2012-Feb. 10, 2012; San Jose; (Motion Picture Expert Group or ISO/IEC JTC1/SC29/WG11 ), No. m23016, Jan. 30, 2012 (Jan. 30, 2012), XP030051541.

* cited by examiner

TRANSMITTING METHOD AND RECEIVING METHOD

BACKGROUND

1. Technical Field

The present disclosure relates to a data transmitting method and a data receiving method.

2. Description of the Related Art

Conventionally, a technique of transmitting encoded data in predetermined transmission formats is known. The encoded data is generated by encoding content including video data and audio data based on moving image coding standards such as HEVC (High Efficiency Video Coding).

Predetermined transmission formats include, for example, MPEG-2 TS (Moving Picture Experts Group-2 Transport Stream) and MMT (MPEG Media Transport) (see Non-Patent Literature 1). For example, Non-Patent Literature 1 discloses a technique of transmitting encoded media data per packet according to MMT.

There is an argument that a video image is hierarchized and encoded to realize scalability to decode and display encoded data, and a transmitting method for hierarchizing and transmitting encoded data is not taken into account.

CITATION LIST

Non-Patent Literature

NPL 1: Information technology—High efficiency coding and media delivery in heterogeneous environment—Part1: MPEG media transport (MMT), ISO/IEC DIS 23008-1

SUMMARY

In one general aspect, the techniques disclosed here feature a transmitting method for transmitting encoded data obtained by hierarchically encoding a video image into a basic layer and an extended layer, the transmitting method including: generating an encoded stream that includes time information and the encoded data, the time information indicating a time at which decoding or displaying processing of the encoded data is performed; and transmitting the generated encoded stream, and the encoded data includes a plurality of sets each including a plurality of access units, each of the plurality of access units which configure a first set can be independently decoded or can be decoded by referring to decoded data of another access unit of the basic layer, the first set being a set for the basic layer among the plurality of sets, each of the plurality of access units which configure a second set can be decoded by referring to decoded data of an access unit of the basic layer, the second set being a set for the extended layer among the plurality of sets, and the time information includes first time information which indicates a time at which the processing performed on a first access unit of the first set is performed and which is based on a reference clock, and second time information used to specify a time at which the processing performed on a second access unit of the second set is performed and which is based on the reference clock.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

DETAILED DESCRIPTION (Base Knowledge of Present Disclosure)

Scalability to decode or display encoded data can be realized by hierarchically encoding access units of the encoded data. When, for example, a frame rate obtained by decoding only encoded data of a lower layer among a plurality of items of encoded data encoded into a plurality of layers is 60 fps, a frame rate obtained by decoding encoded data up to a higher layer becomes 120 fps.

In this regard, a case where encoded data of a lower layer and encoded data of a higher layer are transmitted will be described. When a receiving device which has received encoded data of the lower layer and the encoded data of the higher layer decodes the items of the encoded data of the both layers to obtain a video image of a frame rate of 120 fps, the receiving device needs to rearrange the received encoded data of each layer in a decoding order. However, there are problems that it is necessary to rearrange the items of the received data in the decoding order based on DTSs (Decoding Time Stamp: decoding time) or PTSs (Presentation Time Stamp: presentation time) of access units, and it is not possible to uniquely determine the DTS or the PTS of each access unit of an extended layer.

Coding methods such as MPEG-4 AVC and HEVC (High Efficiency Video Coding) can realize scalability (temporal scalability) in a time direction by using pictures B (bidirectional reference prediction pictures) to which a reference can be made from other pictures.

Figure 1:
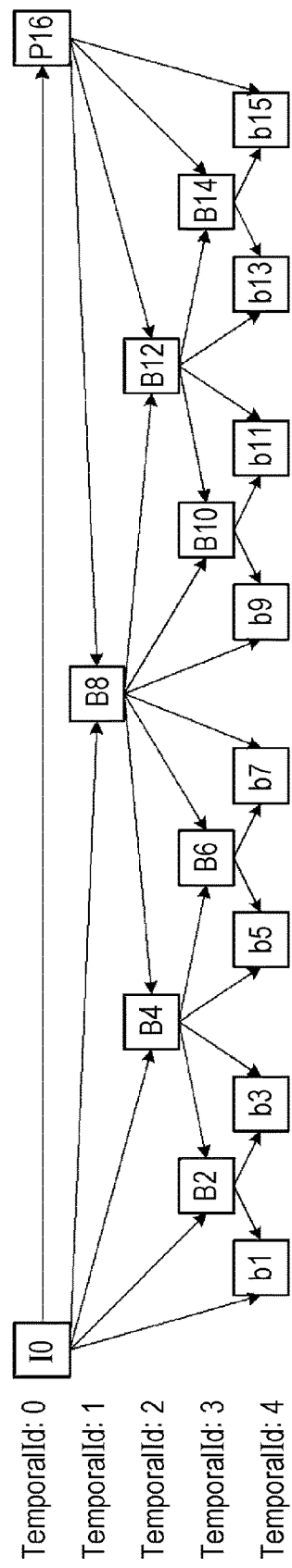
FIG. 1 is a view illustrating an example of a picture predicted structure in each layer hierarchically encoded to realize temporal scalability.

FIG. 1 is a view illustrating an example of a picture predicted structure in each layer hierarchically encoded to realize temporal scalability.

In FIG. 1, TemporalId is a layer identifier of an encoded structure, and TemporalId indicates a deeper layer as a number of TemporalId becomes larger. A plurality of square blocks indicates pictures, Ix in a plurality of blocks represents pictures I (intra-screen prediction pictures), Px indicates pictures P (forward reference prediction pictures), and Bx and bx indicate pictures B (bidirectional reference prediction pictures). Further, x of Ix, Px and Bx indicates a presentation order. That is, x represents an order to display pictures.

Further, arrows between a plurality of pictures indicate reference relationships, and, for example, each picture B4 indicates a prediction image generated by using I0 and B8 as reference images.

In this regard, use of a picture having TemporalId larger than TemporalId of this picture as a reference image is forbidden. More specifically, picture B2 whose TemporalId is 3 cannot use picture b1 whose TemporalId is 4 as a reference image.

As illustrated in FIG. 1, a data structure of encoded data is defined as a plurality of layers to provide temporal scalability. When, for example, all pictures whose TemporalIds are 0 to 4 in FIG. 1 are decoded, a video image of 120 fps (frame per second) is obtained. Further, when only layers whose TemporalIds are 0 to 3 are decoded, a video image of 60 fps is obtained. In FIG. 1, the layers whose TemporalIds are 0 to 3 are basic layers, and the layer whose TemporalID is 4 is an extended layer. That is, when only items of encoded data of the basic layers are decoded, a video image of 60 fps is obtained, and, when items of encoded data of the basic layers and the extended layer are decoded, a video image of 120 fps is obtained. In addition, this is an exemplary case, and the basic layers and the extended layer can be associated in other combinations, too. Further, there may be layers other than two types of layers of the basic layers and the extended layer. That is, there may be three types of layers or more.

Figure 2:
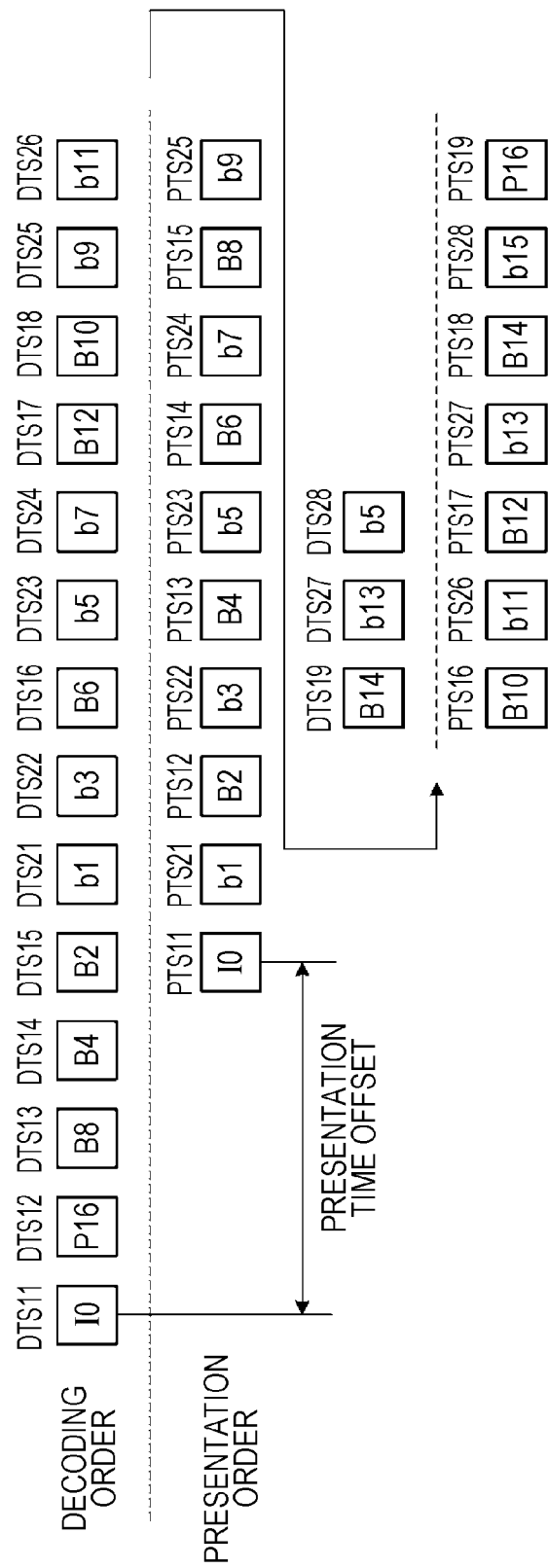
FIG. 2 is a view illustrating a relationship between a decoding time (DTS: Decoding Time Stamp) and a presentation time (PTS: Presentation Time Stamp) of each picture in FIG. 1.

FIG. 2 is a view illustrating a relationship between a decoding time (DTS: Decode Time Stamp) and a presentation time stamp (PTS: Presentation Time Stamp) of each picture in FIG. 1. As illustrated in FIG. 2, a decoding order and a presentation order of a plurality of pictures are different in some cases. In this case, picture I0 is displayed after picture B4 is decoded to prevent production of a gap in display processing. More specifically, it is indispensable that picture b1 which comes immediately after picture I0 in the presentation order has been decoded to prevent production of a gap in the display processing. Therefore, by displaying picture I0 after picture B4 is decoded, it is possible to display picture b1 immediately after picture I0 is displayed. That is, in this case, a time at which picture b1 can be displayed immediately after picture I0 is displayed is set as a presentation time offset which is a time between a time at which picture I0 is decoded and a time at which picture I0 is displayed.

In this regard, a layer to be decoded is switched according to capability of receiving devices by allowing a receiving device which can decode items of encoded data up to the extended layer to reproduce a video image of 120 fps, and allowing a receiving device which can decode only the items of encoded data of basic layers due to processing capability to reproduce a video image of 60 fps. In this case, by transmitting items of encoded data of the basic layers and encoded data of the extended layer identifiably, each receiving device can decode the items of received data by filtering the items of the received data according to capability of each receiving device. That is, the receiving device which can decode the items of encoded data up to the extended layer can decode both of the items of encoded data of the basic layers and the encoded data of the extended layer, and the receiving device which can decode only the encoded data of the basic layers can decode only the items of encoded data of the basic layers by filtering the items of encoded data.

Further, each hierarchized encoded data is multiplexed in various multiplexing formats such as MPEG-2 TS (Transport Stream), MMT (MPEG Media Transport), MPEG-DASH (Dynamic Adaptive Streaming over HTTP) or RTP (Real-time Transport Protocol), and is transmitted. In this regard, according to MMT and MPEG-DASH, multiplexing is basically performed by using MP4 (a file format which is based on ISO Base Media File Format of MPEG). According to MP4 in particular, information such as DTSs and PTSs is expressed as difference information of DTSs or PTSs between two continuous access units (corresponding to pictures in the case of a video image).

Figure 3:
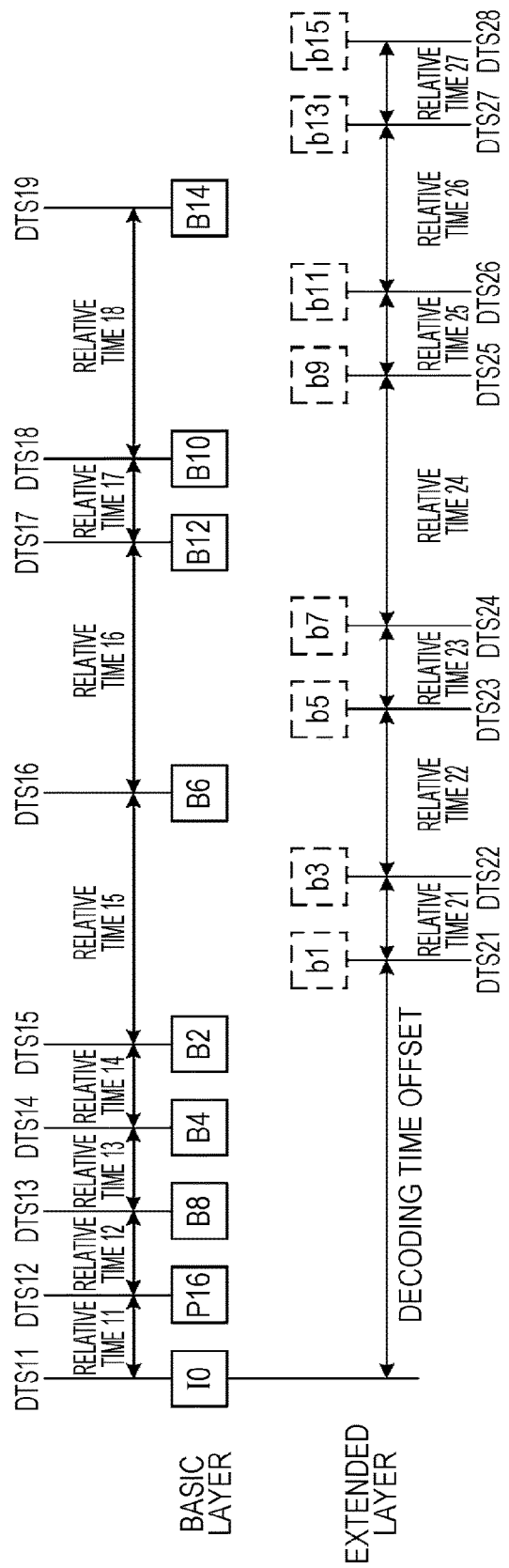
FIG. 3 is a view illustrating a difference between DTSs of head pictures of each basic layer and an extended layer.
Figure 4:
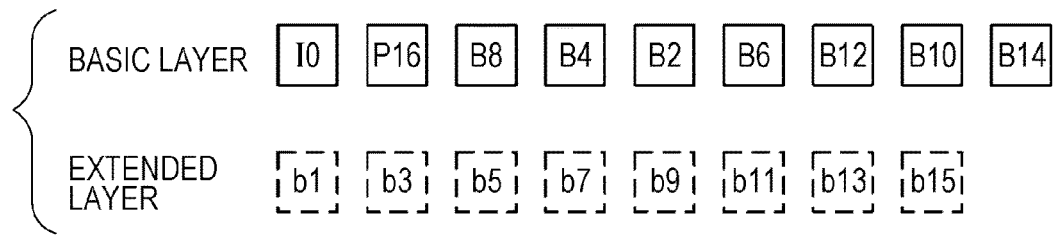
FIG. 4 is a view illustrating encoded data of each basic layer and encoded data of the extended layer.

FIG. 3 is a view illustrating a difference between DTSs of head pictures in each basic layer and the extended layer. More specifically, FIG. 3 is a view illustrating pictures arranged in the decoding order in FIG. 2 as pictures belonging to the basic layers and pictures belonging to the extended layer. FIG. 4 is a view illustrating encoded data of each basic layer and encoded data of the extended layer.

As illustrated in FIG. 3, a difference (referred to as a "decoding time offset" below) is produced between DTS 11 of head picture I0 of each basic layer and DTS 21 of head picture b1 of the extended layer. However, an MP4-based multiplexing method has a problem that it is possible to provide only relatively time information of each basic layer or the extended layer, and it is not possible to express a decoding time offset. That is, this multiplexing method has a problem that it is not possible to specify a timing at which a picture of the extended layer is decoded after the basic layers are decoded.

Hence, when items of encoded data of the basic layers and encoded data of the extended layer are independently transmitted, the receiving device separately receives the items of the encoded data of the basic layers and the encoded data of the extended layer as illustrated in FIG. 4. In this case, when the items of encoded data of the both layers are decoded, the items of encoded data of the both layers need to be rearranged in the decoding order illustrated in FIG. 3, and input to a decoder (decoder). Hence, there is also a problem that processing of obtaining a DTS per access unit and rearranging access units in the decoding order based on the DTSs is performed, and a processing amount before decoding increases.

To solve these problems, a data transmitting method according to one aspect of the present disclosure is a transmitting method for transmitting encoded data obtained by hierarchically encoding a video image into a basic layer and an extended layer, and includes: generating an encoded stream that includes time information and the encoded data, the time information indicating a time at which decoding or displaying processing of the encoded data is performed; and transmitting the generated encoded stream, and the encoded data includes a plurality of sets each including a plurality of access units, each of the plurality of access units which configure a first set can be independently decoded or can be decoded by referring to decoded data of another access unit of the basic layer, the first set being a set for the basic layer among the plurality of sets, each of the plurality of access units which configure a second set can be decoded by referring to decoded data of an access unit of the basic layer, the second set being a set for the extended layer among the plurality of sets, and the time information includes first time information which indicates a time at which the processing performed on a first access unit of the first set is performed and which is based on a reference clock, and second time information used to specify a time at which the processing performed on a second access unit of the second set is performed and which is based on the reference clock.

According to this, even when the items of encoded data of the basic layer and the extended layer are transmitted as items of different data, it is possible to specify a time at which the access unit of the extended layer is processed.

For example, the first access unit may be an access unit on which the processing is performed first, in the first set, and the second access unit may be an access unit on which the processing is performed first, in the second set.

For example, the processing may be decoding, each of a plurality of access units other than the first access unit of the first set may be associated with a first relative time which is based on a time indicated by the first time information, and a time at which each of a plurality of access units of the first set is displayed may be specified based on a second relative time which is based on a time at which each of a plurality of access units is decoded, each of a plurality of access units other than the second access unit of the second set may be associated with a third relative time which is based on a time indicated by the second time information, and a time at which each of a plurality of access units of the second set is displayed may be specified based on a fourth relative time which is based on a time at which each of a plurality of access units is decoded.

For example, the processing may be displaying, each of a plurality of access units other than the first access unit of the first set may be associated with a fifth relative time which is based on a time indicated by the first time information, a time at which each of a plurality of access units of the first set is displayed may be specified based on a sixth relative time which is based on a time at which each of a plurality of access units is displayed, each of a plurality of access units other than the second access unit of the second set may be associated with a seventh relative time which is based on a time indicated by the second time information, and a time at which each of a plurality of access units of the second set is decoded may be specified based on an eighth relative time which is based on a time at which each of a plurality of access units is displayed.

For example, the second time information may be a time offset that is a difference value from a first absolute time indicated by the first time information.

For example, the set may be a random access to which a random access unit can be made, and the first access unit and the second access unit may be random access points.

For example, the first set comprises a plurality of first sets and the second set comprises a plurality of second sets. Each of the plurality of first sets is associated with a corresponding one of the plurality of second sets.

For example, the second sets may be decoded by referring only to decoded data of the first sets associated with the second sets on the one-on-one basis.

For example, each of the second sets may further include second header information in which identification information used to identify each of the first sets associated with the second sets on the one-on-one basis, and the second time information are stored.

For example, each of the first sets may include first header information in which identification information used to identify each of the second sets associated with the first sets on the one-on-one basis, and the second time information are stored.

For example, the encoded stream may further include association information in which first identification information used to identify each of the first sets and second identification information used to identify each of the second sets associated with each of the first sets on the one-on-one basis are associated with each other.

For example, the time information may be stored in control information of the encoded stream.

For example, the second time information may indicate a second absolute time different from a first absolute time indicated by the first time information.

For example, the generating step may include generating a first encoded stream including the first set and a second encoded stream including the second set, and the transmitting step may include transmitting the first encoded stream by using a first channel, and transmitting the second encoded stream by using a second channel different from the first channel.

For example, the generating step may include generating one of the first encoded stream and the second encoded stream according to MPEG-2 TS (Moving Picture Experts Group-2 Transport Stream), and generating the other one of the first encoded stream and the second encoded stream according to MMT (MPEG Media Transport).

For example, one of the first channel and the second channel may be a channel for broadcasting, and the other one of the first channel and the second channel may be a channel used for communication.

In addition, these overall or specific aspects may be realized by a data receiving method, an integrated circuit, a computer program or a recording medium such as a computer-readable CD-ROM, or may be realized by an arbitrary combination of a data receiving method, the integrated circuit, the computer program and the recording medium.

The data transmitting method and the data receiving method according to one aspect of the present disclosure will be specifically described with reference to the drawings.

In addition, each of the exemplary embodiments described below is one specific example of the present disclosure. Numerical values, shapes, materials, components, arrangement positions and connection modes of the components, steps and an order of the steps described in following exemplary embodiments are exemplary, and do not intend to limit the present disclosure. Further, components which are not recited in an independent claim which represents a top concept among the components in the following exemplary embodiments will be described as arbitrary components.

EXEMPLARY EMBODIMENTS

[Transmitting Method]

The transmitting method (transmitting device) according to the exemplary embodiments will be describe below with reference to the drawings. The transmitting method for transmitting encoded data according to MMT will be described as an example in the exemplary embodiments.

Figure 5:
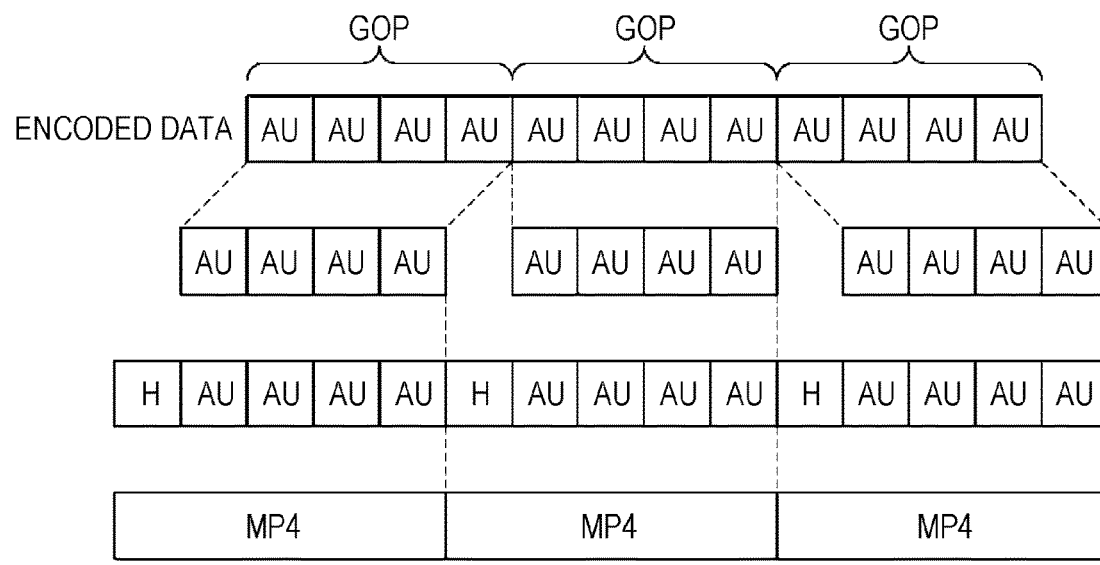
FIG. 5 is a view for explaining a data structure of an encoded stream according to MMT.
Figure 6:
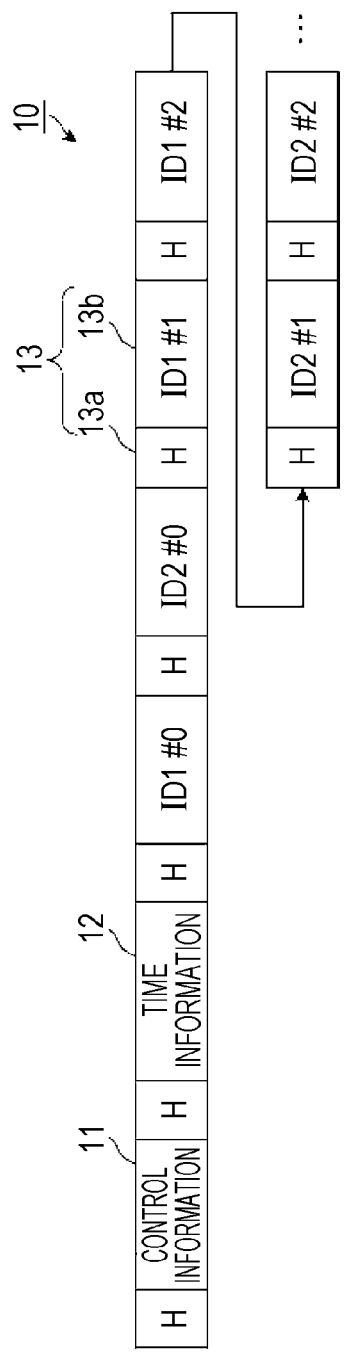
FIG. 6 is a view for explaining a data structure of an encoded stream according to MMT.

First, a data structure of an encoded stream according to MMT will be described. FIGS. 5 and 6 are views for explaining data structures of encoded streams according to MMT.

As illustrated in FIG. 5, encoded data includes a plurality of access units (AU). Encoded data is, for example, AV data encoded based on moving image coding standards such as HEVC. More specifically, encoded data includes video data, audio data, meta data accompanying the video data and the audio data, still images, and files. When encoded data is video data, one AU is a unit corresponding to one picture (one frame).

According to MMT, encoded data is converted into MP4 data (an MP4 header is given) according to an MP4 file format in GOP (Group Of Picture) units. That is, encoded data includes a plurality of sets (GOPs) each including a plurality of access units. Each GOP is a random access point of encoded data, and a head access unit of each GOP in a decoding order corresponds to an IDR (Instantaneous Decoding Refresh) picture according to HEVC or AVD or a picture I according to non-IDR. Each of a plurality of these sets belongs to one of the basic layers and the extended layer. In this regard, a set belonging to the basic layers is the first set, and a set belonging to the extended layer is the second set.

In addition, each of a plurality of access units which configure the first set belongs to the basic layers and therefore can be independently decoded or can be decoded by referring to decoded data of another access unit of each basic layer. In addition, each of a plurality of access units which configure the second set belongs to the extended layer and therefore can be decoded by referring to decoded data of an access unit of each basic layer.

In the MP4 header included in the MP4 data, relative values of a presentation time (the above PTS) and a decoding time (the above DTS) of an access unit are described. Further, in the MP4 header, sequence numbers of the MP4 data are described. In addition, the MP4 data (MP4 file) is an example of an MPU (Media Processing Unit) which is a data unit defined according to the MMT standards. Only sample data in the MPU may also be transmitted without transmitting an MP4 header in the MPU. In this case, too, the MPU corresponds to a random access unit, and a sample which configures a MPU and the MPU are associated on a one-on-one basis. Further, the MPU may include a plurality of GOPs.

Further, as illustrated in FIG. 6, encoded stream 10 according to MMT includes control information 11, time information 12 and a plurality of MMT packets 13. In other words, encoded stream 10 is a packet sequence of MMT packets 13.

Encoded stream 10 (MMT stream) is one of one or more streams which configure one MMT package. The MMT package corresponds to, for example, one broadcast program content.

Control information 11 includes information indicating that encoded stream 10 is a scalable-coded stream (a stream including both of basic layers and an extended layer), and information of a type of scalable coding and the number of layer levels (a number of layers). In this regard, the type of scalable coding is temporal scalability, spatial scalability and SNR (Signal-to-Noise Ratio) scalability, and the number of layer levels refers to the number of layers such as basic layers and the extended layers.

Further, control information 11 includes, for example, information indicating an association relationship between a plurality of assets and packet IDs. In addition, each asset is a data entity including data of same transport characteristics, and is, for example, one of video data and audio data.

Control information 11 is, more specifically, CI (Composition Information) and an MPT (MMT Package Table) according to MMT. In addition, control information 11 is a PMT (Program Map Table) according to MPEG2-TS, and is MPD (Media Presentation Description) according to MPEG-DASH.

Time information 12 is information used to determine a PTS or a DTS of an access unit. Time information 12 is, more specifically, for example, a PTS or a DTS which is an absolute time of a head access unit of the MPU belonging to each basic layer. More specifically, time information 12 can indicate an absolute value of the PTS of the head access unit of the MPU in the presentation order in the case of the PTS, and indicate an absolute time of the DTS of the head access unit of the MPU in the decoding order in the case of the DTS. Further, time information 12 may be stored as program information in control information 11. When time information 12 is stored as the program information, for example, the program information is stored in an MMT message and time information 12 can be stored as a descriptor in the program information.

When, for example, it is assumed that all of a plurality of pictures of the basic layers in FIG. 3 configure one first set, picture I0 that is the first access unit to be decoded first in the decoding order of the first set is decoded at a time indicated by DTS 11. In this case, first time information indicating a time (DTS 11) at which the first access unit of the first set is decoded and which is based on a reference clock may be stored as time information 12 (first absolute time) of encoded stream 10. That is, the first absolute time indicates, for example, DTS 11 itself.

Further, when it is assumed that all of a plurality of pictures of the extended layer in FIG. 3 configure one second set, picture b1 that is the second access unit to be decoded first in the decoding order of the second set is decoded at a time indicated by DTS 21. In this case, second time information used to specify a time (DTS 21) at which the second access unit of the second set is decoded and which is based on a reference clock is a decoding time offset that is a difference value from the first absolute time indicated by the first time information as described above. Similar to the first time information, the second time information may be stored as time offset information (decoding time offset) of encoded stream 10. That is, DTS 21 is specified by adding the decoding time offset indicated by the second time information, to DTS 11 indicated by the first time information. Further, the absolute value of the time information of the access unit of the second set may be stored as the second time information instead of the time offset information of the first time information.

In addition, the reference clock is an NTP (Network Time Protocol) when encoded streams are transmitted according to an MMT mode, and is a PCR (Program Clock Reference) when encoded streams are transmitted according to an MPEG2-TS mode. In this regard, the NTP needs to be a reference clock set by the transmitting device and does not necessarily need to match with an NTP value of an NTP server typically used on the Internet.

MMT packet 13 is data obtained by converting MP4 data into a packet. According to the exemplary embodiments, one MMT packet 13 includes one MP4 data (MPU). As illustrated in FIG. 6, MMT packet 13 includes header 13a (an MMT packet header or a TS packet header in the case of MPEG2-TS) and payload 13b.

In payload 13b, MP4 data is stored. In addition, in payload 13b, divided MP4 is stored in some cases.

Header 13a is auxiliary information related to payload 13b. For example, header 13a includes a packet ID and time information. The time information described herein is a relative value of a presentation time (PTS) or a decoding time (DTS) of MP4 data.

The packet ID is an identification number indicating an asset of data included in MMT packet 13 (payload 13b). The packet ID is a unique identification number of each asset which configures an MMT package.

Thus, each encoded stream includes time information (the DTS or the PTS) indicating a time at which processing of decoding or displaying encoded data is performed, and items of encoded data (ID1_#0, ID2_#0, ID1_#1, ID1_#2, ID2_#1, ID2_#2 and . . . in FIG. 6). This time information includes the above first time information and the second time information.

Figure 7:
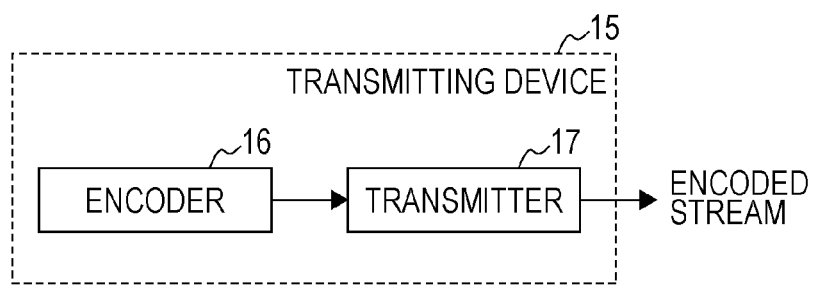
FIG. 7 is a block diagram illustrating a configuration of a transmitting device according to an exemplary embodiment.
Figure 8:
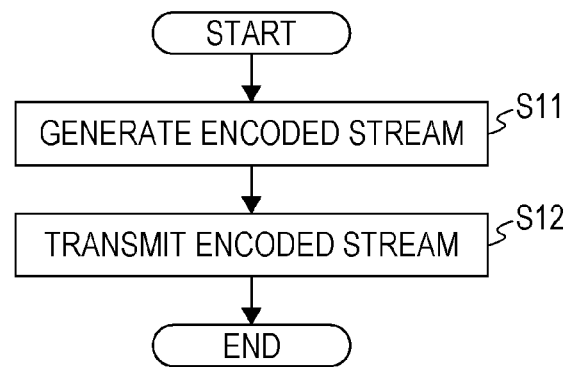
FIG. 8 is a flowchart of the transmitting method according to the exemplary embodiment.

FIG. 7 is a block diagram illustrating a configuration of a transmitting device according to the exemplary embodiments. FIG. 8 is a flowchart of the transmitting method according to the exemplary embodiments.

As illustrated in FIG. 7, transmitting device 15 includes encoder 16 and transmitter 17. In addition, more specifically, components of transmitting device 15 are realized by a microcomputer, a processor or a dedicated circuit.

According to the transmitting method for transmitting encoded stream 10 according to the exemplary embodiments, encoded stream 10 including time information indicating a time at which a set including a plurality of access units is decoded or displayed, and a plurality of access units which configure the set is generated (S11: generating step).

Generated encoded stream 10 is transmitted by transmitter 17 by using a channel (S12: transmitting step).

First Exemplary Embodiment

Next, a transmitting method and a receiving method in a case where encoded data of an extended layer is transmitted in an MP4-based multiplexing format will be more specifically described.

The MP4-based multiplexing format may be, for example, MMT, DASH or file data of MP4. According to MMT, an MPU (Media Processing Unit) corresponds to an MP4 file, and, according to DASH, a segment corresponds to Movie Fragment of MP4.

As illustrated in FIG. 3, a multiplexing format which expresses time information indicating a time at which each sample is decoded (displayed) as a relative time (a difference between samples) of DTSs (or PTSs) of a plurality of access units, and which does not indicate an absolute value of time information indicating a time at which all of a plurality of access units of a set are decoded (displayed) is applicable to a format other than MP4, too. In addition, each sample described herein refers to a unit at which data is handled in MP4 and corresponds to an access unit.

(Decoding Time and Presentation Time)

Figure 9:
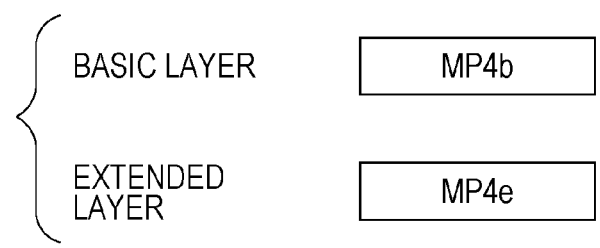
FIG. 9 is a view illustrating an MP4 file including encoded data of the basic layer and an MP4 file including encoded data of the extended layer.

A decoding time (DTS) of an access unit of the extended layer will be described first by using an MP4 file as an example. FIG. 9 is a view illustrating an MP4 file (MP4b) including items of encoded data of the basic layers and an MP4 file (MP4e) including encoded data of the extended layer.

As illustrated in FIG. 9, it is assumed that there is an MP4 file (MP4b) including the items of encoded data of the basic layers and an MP4 file (MP4e) including encoded data of the extended layer. In this regard, when a decoding time offset between the MP4b and the MP4e is dec_offset, a DTS of each sample of the extended layer in the MP4e is expressed as the following equation.

$$\text{sample\_}e(i)\_\text{dec}=\text{sample\_}e(i)\_\text{dec\_base}+\text{dec\_offset} \quad \text{(Equation 1)}$$

sample_e(i)_dec: a DTS of an ith sample of an extended layer sample_e(i)_dec_base: a DTS of an uncorrected sample (a DTS of each sample in a case where a DTS of a head sample is 0) calculated from a difference total sum of decoding times of 0th to ith samples of the extended layer (a total sum of sample_delta of 'stts' of MP4 or sample_duration of Movie Fragment).

According to the above (equation 1), a decoding time offset (dec_offset) is an offset value in a case where a DTS of a head sample of the basic layer in a decoding order is assumed to be 0.

In this regard, when the DTS of the head sample of each basic layer is delta, the DTS of each sample of the extended layer in the MP4e is expressed by the following equation.

$$\text{sample\_}e(i)\_\text{dec}=\text{sample\_}e(i)\_\text{dec\_base}+\text{dec\_offset}+ \text{delta} \quad \text{(Equation 2)}$$

More specifically, in FIG. 3, DTS 23 of picture b5 that is a third sample of the extended layer can be calculated as follows by using (equation 2) since sample_e(i)_dec_base is calculated by adding relative time 21 and relative time 22 and delta is DTS 11.

$$\text{DTS 23}=\text{relative time 21}+\text{relative time 22}+\text{dec\_offset}+\text{DTS 11} \quad \text{(Equation 3)}$$

Further, the DTS of each sample of the basic layer in the MP4b is expressed by the following equation.

$$\text{sample\_}b(i)\_\text{dec}=\text{sample\_}b(i)\_\text{dec\_base}+\text{dec\_offset} \quad \text{(Equation 4)}$$

sample_b(i)_dec: a DTS of an ith sample in each basic layer sample_b(i)_dec_base: a DTS of an uncorrected sample (a DTS of each sample in a case where a DTS of a head sample is 0) calculated from a difference total sum of decoding times of 0th to ith samples of the basic layers (a total sum of sample_delta of 'stts' of MP4 or sample_duration of Movie Fragment).

In this regard, when the DTS of the head sample of each basic layer is delta, the DTS of each sample of the extended layer in the MP4b is expressed by the following equation.

$$\text{sample\_}b(i)\_\text{dec}=\text{sample\_}b(i)\_\text{dec\_base}+\text{dec\_offset}+ \text{delta} \quad \text{(Equation 5)}$$

That is, each of a plurality of access units other than a first access unit of a first set is associated with first relative times (relative times 11 to 18) which are based on a time indicated by first time information (e.g. DTS 11). Further, times (PTSs 11 to 19) at which each of the plurality of access units of the first set is displayed is specified based on a second relative time which is based on a time at which each of a plurality of access units is decoded. That is, for example, the second relative time which is a difference from time DTS 13 at which picture B8 is decoded is associated with picture B8, and time PTS 15 at which picture B8 is displayed is calculated by adding the second relative time associated with picture B8, to DTS 13.

Further, each of the plurality of access units other than a second access unit of a second set is associated with third relative times (relative times 21 to 27) which are based on a time indicated by second time information (e.g. DTS 21). Furthermore, times (PTSs 21 to 28) at which each of the plurality of access units of the second set is displayed are specified based on a fourth relative time which is based on a time at which each of the plurality of access units is decoded. That is, for example, the fourth relative time which is a difference from time DTS 26 at which picture b11 is decoded is associated with picture b11, and time PTS 26 at which picture b11 is displayed is calculated by adding the fourth relative time associated with picture b11, to DTS 26.

(Storage of Decoding Time Offset)

In addition, there are the following three cases of storage destinations of information (decoding time offset information) indicating a decoding time offset.

(1) Case where decoding offset information is stored in MP4 file including track of extended layer The decoding time offset information includes at least a decoding time offset and identification information of a track of each basic layer. The identification information of the track of each basic layer includes a track ID of the track of each basic layer and identification information of an MP4 file (a file name of an MP4 file) including the track of each basic layer. That is, the second set of the extended layer includes second header information in which identification information used to identify the first set associated with the second set, and the second time information are stored.

(2) Case where decoding offset information is stored in MP4 file including track of basic layer The decoding time offset information includes at least a decoding time offset and identification information of a track of the extended layer. That is, the first set of the basic layer includes first header information in which identification information used to identify the second set associated with the first set, and the second time information are stored.

(3) Case where decoding offset information is stored in information in which MP4 file including track of each basic layer and MP4 file including track of extended layer are associated with each other The decoding time offset information includes at least a decoding time offset, identification information of a track of each basic layer and identification information of the track of the extended layer. That is, the encoded stream may include association information in which first identification information used to identify the first set and second identification information used to identify the second set associated with the first set on the one-on-one basis are associated with each other, and the second time information may be stored in the association information.

In addition, in the case of above (1) or (2), a Box for storing the decoding time offset information is defined, and the decoding time offset information can be arranged right below the Box of a track level or in the same level as or a higher layer of a track level. Further, the decoding time offset information may be included by extending an existing Box without defining a new Box.

Further, the decoding time offset may be realized by using a function of an empty duration in 'elst' of 'moov' or 'traf' of 'moo'. In this case, too, it is necessary to associate a track of the extended layer with a track of each basic layer.

Further, in the case of above (3), the decoding time offset information may be stored in a track of an MP4 file independent from tracks of each basic layer and the extended layer or may be stored in different tracks in the same MP4 file.

When different tracks are stored in the same MP4 file, decoding time offset information can be stored in a higher Box than a Box in track units such as a level right below 'moov' or 'moof'. In this case, identification information of an MP4 file is not necessary as decoding time offset information.

When a DTS and a PTS are different in the case of MP4, while header information of MP4 includes difference information of this difference (the second relative times or the fourth relative time), the difference information is applied to the DTS in which the decoding time offset has been reflected.

Values of time scales of tracks of each basic layer and the extended layer are desirably adjusted. When the time scales are different, in the case of above (3), the time scale of the decoding time offset information may be additionally indicated or use of the time scale of the track of one of each basic layer and the extended layer may be defined in advance.

In addition, the decoding time offset is applied only to the DTS of the extended layer.

In addition, the MP4 file in which each basic layer or the extended layer is stored may include only the track of each layer or may include other tracks.

Second Exemplary Embodiment

When MP4 data is reproduced while being received (progressive download or HTTP streaming), a random access to a head of Movie Fragment can be made to decode and reproduce the MP4 data.

As in Movie Fragment, units to which a random access can be made will be referred to as random access units (RAU), and head data of each RAU will be referred to as a random access point (RAP). That is, a set (GOP) including a plurality of access units will be referred to as a random access unit, and first access units of the first set and second access units of the second set will be referred to as random access points. In this case, in the case of a RAU (i.e., the second set) including encoded data of the extended layer, it is necessary to reflect a decoding time offset to determine a DTS of a sample of a RAU (corresponding to an access unit in data units of MP4).

Figure 10:
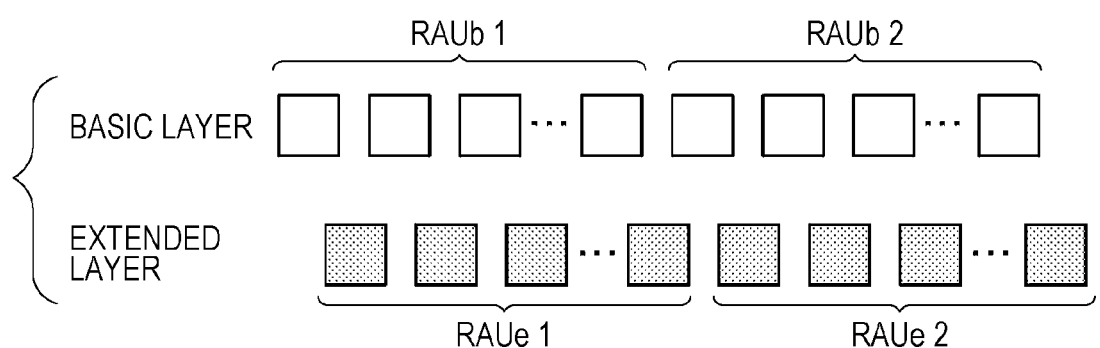
FIG. 10 is a view illustrating a configuration example of random access units (RAU) of each basic layer and the extended layer.

FIG. 10 is a view illustrating a configuration example of RAUs of each basic layer and the extended layer. A RAUb in FIG. 10 indicates a RAU of the basic layer (first set), and a RAUe indicates a RAU of the extended layer (second set).

The RAUb and the RAUe are configured to form a pair. That is, each of a plurality of first sets is associated with a corresponding one of a plurality of second sets. Samples that configure one RAUe refer to a sample included in a corresponding RAUb which forms a pair with the RAUe, but do not refer to samples included in other RAUbs. That is, the second set can be decoded by referring only to decoded data of the first set associated with the second set on the one-on-one basis. Hence, it is guaranteed that, by obtaining the RAUb and the RAUe which form a pair, it is possible to decode the samples included in the RAUs of both of each basic layer and the extended layer.

In this regard, the RAUs which form a pair can be associated with each other based on sequence numbers used to identify the RAUs. In this case, a decoding time of a head sample of the RAU of the extended layer in the decoding order can be determined by adding a decoding time offset to a decoding time of a head sample of the pairing RAU of each basic layer in the decoding order.

A DTS that becomes a head sample of the RAU of each basic layer in the decoding order is a first absolute time. The first absolute time is, for example, a time defined according to UTC (Coordinated Universal Time). The first absolute time may be stored in content management information such as a PMT (Program Map Table) according to MPEG-2 TS or in content management information obtained prior to reception of content. Alternatively, information indicating an absolute value of a DTS may be stored in header information of Movie Fragment. In addition, a decoding time of the head sample of the RAU of the basic layer may be arbitrarily set by the receiving device.

The decoding time offset information is necessary only for a first RAU to which a random access has been made. Therefore, by reflecting the decoding time offset in the head sample of the first RAU in the decoding order, decoding times of subsequent samples of the first RAU and samples of RAUs subsequent to the first RAU can be determined by successively adding difference information of DTSs of continuous samples included in header information of MP4.

Consequently, information indicating that the decoding time offset information is necessary only when the DTS of the head sample of the first RAU after the random access is determined may be additionally stored.

Information indicating whether or not the RAUs of each basic layer and the extended layer form a pair may be indicated in an MP4 file including the track of each basic layer or the extended layer or in content management information.

In addition, the RAUs of each basic layer and the extended layer may not necessarily form a pair. When a pair is not formed, information indicating an absolute value of the DTS of the head sample of the RAU of the extended layer in the decoding order may be indicated in header information or content management information of an MP4 file. In addition, even when the RAUs of each basic layer and the extended layer form a pair, information indicating the absolute value of the DTS of the head sample of the RAU of the extended layer may be stored. That is, the second time information may indicate a second absolute time different from a first absolute time indicated by the first time information.

Further, when, for example, each basic layer is transmitted by using MPEG-2 TS and the extended layer is transmitted by using DASH or MMT, the RAUs cannot be paired unless a signaling method for the RAUs is additionally defined according to TS. In such a case, the decoding time offset of the extended layer or the absolute value of the DTS of the head sample in the RAU can be desirably obtained from the content management information.

In addition, in the case of MPEG-2 TS, too, it is possible to indicate a boundary between RAUs based on header information in a TS packet or a PES packet in which signaling information of the RAU is stored. Further, when transmission is performed by using a format for streaming such as RTP, boundary information such as a sequence number of a RAU can be indicated in a payload header of a RTP packet. When RTP is used, it is possible to describe identification information of sessions of each basic layer and the extended layer and a dependence relationship in meta information for describing sessions such as a SDP (Session Description Protocol).

Upon decoding, the samples of each basic layer and the extended layer are rearranged in the decoding order based on DTSs of the RAU of each basic layer and the RAU of the extended layer, and are input to a decoder. In this regard, when items of encoded data of each basic layer and the extended layer are arranged in the decoding order in received data, samples do not need to be rearranged.

Third Exemplary Embodiment

Figure 11:
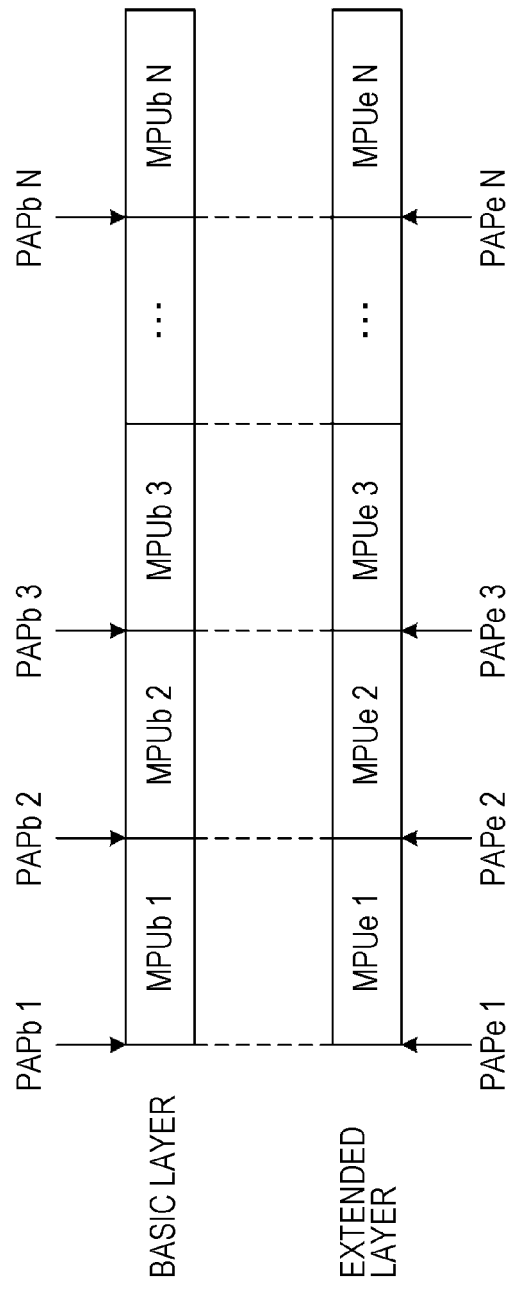
FIG. 11 is a view illustrating an example where items of data of each basic layer and the extended layer are transmitted by using MMT.

FIG. 11 is a view illustrating an example where items of data in each basic layer and an extended layer are transmitted by using MMT.

FIG. 11 illustrates that each basic layer and the extended layer are transmitted as different assets, and an MPU corresponds to a random access unit. FIG. 11 illustrates an MPU of the basic layer as an MPUb, and an MPU of the extended layer as an MPUe. When the MPUb of each basic layer and the MPUe of the extended layer form a pair, a DTS of a head sample of the MPUe of the extended layer can be determined in the same way as a RAU of MP4 data described with reference to FIG. 10.

In this regard, the MPU corresponds to an MP4 file instead of Movie Fragment. Therefore, decoding time offset information may be stored right below 'moov' or right below 'mmpu' which is a Box indicating attribute information of the MPU such as an MPU sequence number.

Identification information of tracks of each basic layer and the extended layer of decoding time offset information may be only information (a file name, an asset ID or an MPU sequence number) used to identify an MP4 file indicating an MPU when the MPU includes only one track including encoded data of each asset.

When DASH is used, too, a segment (more accurately, Media segment) corresponds to one or more Movie Fragments. Consequently, it is possible to determine a decoding time in the same way as the above method performed for MP4 data.

According to DASH, although TS data can also configure a segment, MP4 (ISO Base Media File Format) configures a segment.

[Receiving Method]

Figure 12:
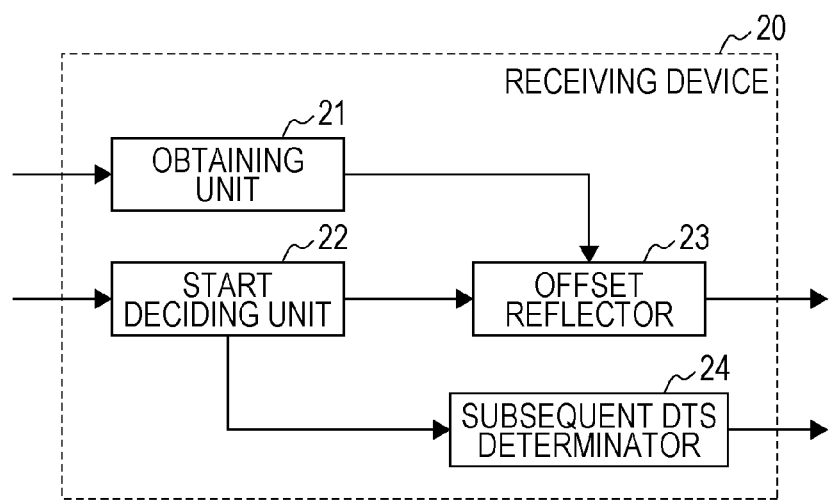
FIG. 12 is a block diagram illustrating an example of a configuration of a receiving device.
Figure 13:
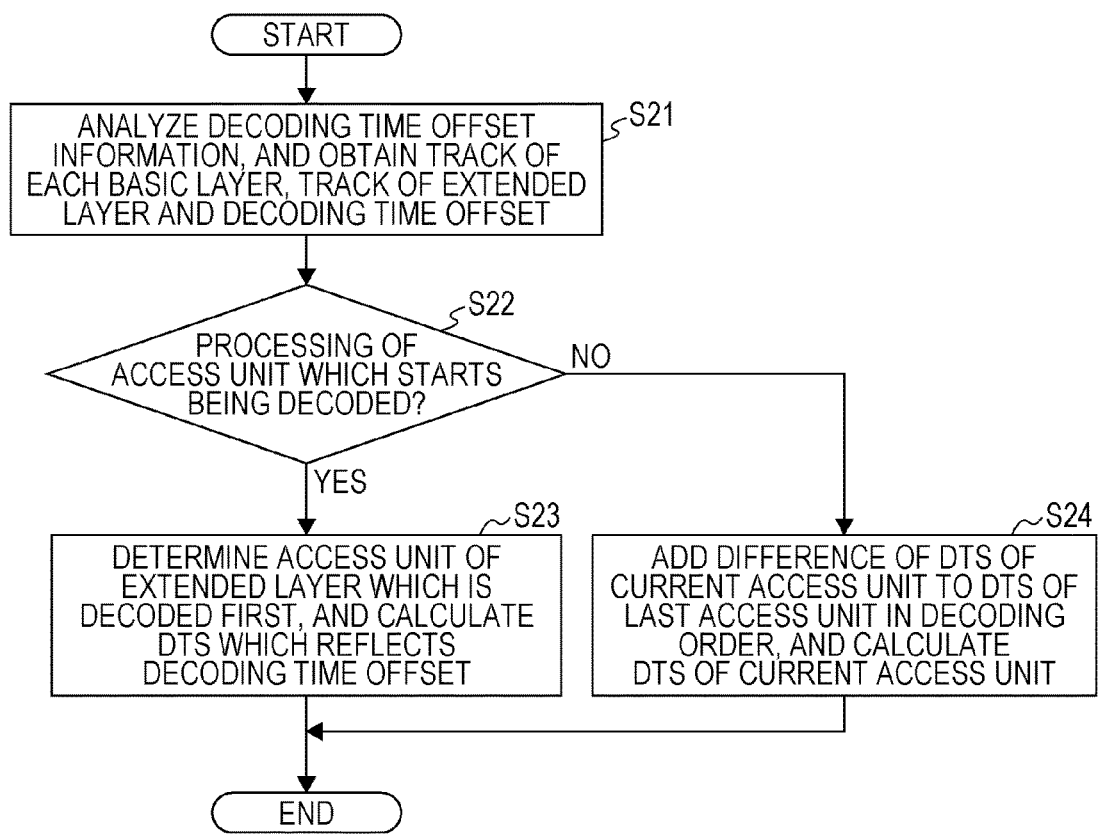
FIG. 13 is a view illustrating a flowchart illustrating an operation of determining a DTS of an access unit included in the extended layer.

FIG. 12 is a block diagram illustrating an example of a configuration of a receiving device. FIG. 13 is a view illustrating a flowchart illustrating an operation of determining a DTS of an access unit included in the extended layer.

An example of the operation of determining a DTS of an access unit which configure the extended layer to decode the access unit of the extended layer will be described.

As illustrated in FIG. 12, receiving device 20 includes obtaining unit 21, start deciding unit 22, offset reflector 23 and subsequent DTS determinator 24. In addition, more specifically, components of the receiving device are realized by a microcomputer, a processor or a dedicated circuit.

In this regard, receiving device 20 determines whether to decode only each basic layer or decode both of each basic layer and the extended layer, in a previous step of step S21 according to information selected by a user in advance or decoding capability of the receiving device.

First, obtaining unit 21 of receiving device 20 receives encoded stream 10, analyzes decoding time offset information of encoded stream 10 and obtains a track of the basic layer, the track of the extended layer and a decoding time offset (S21).

In addition, when the decoding time offset information is included in a file or in a track in which encoded data of the extended layer is stored, processing in step S21 may be performed between next step S22 and step S23.

Further, when information indicating an absolute value of a DTS of a head access unit of a RAU of the extended layer in a decoding order is indicated, the DTS of the access unit of the extended layer can be obtained only from information of the extended layer. In this regard, a DTS of an access unit of the basic layer which starts being decoded is used to determine an access unit which starts being decoded.

Next, start deciding unit 22 of receiving device 20 decides whether or not processing is processing of the access unit which starts being decoded (S22).

When start deciding unit 22 of receiving device 20 decides that the processing is the processing of the access unit which starts being decoded (Yes in S22), offset reflector 23 determines an access unit of the extended layer which starts being decoded first and calculates a DTS which reflects a decoding time offset (S23). More specifically, by adding the decoding time offset to a first absolute value which is the DTS of the access unit of the basic layer which starts being decoded first, the DTS of the access unit of the extended layer which starts being decoded first is calculated.

In this regard, when the access unit of the basic layer which starts being decoded is AU_b, the access unit of the extended layer whose DTS comes immediately after a DTS of Au_b is the access unit (AU_e) of the extended layer which starts being decoded.

When RAUs of the basic layer and the extended layer form a pair, the RAU of the extended layer which forms a pair with the RAU of each basic layer which starts being decoded is a RAU of the extended layer which starts being decoded. The head access unit of the RAU which starts being decoded in the decoding order is AU_e. The RAU of the extended layer which forms a pair with the RAU of each basic layer can be obtained by searching for an MPU whose MPU sequence number is the same as an MPU sequence number of each basic layer. In this regard, the MPU sequence number can be stored in header information of an MMT packet.

When the RAUs of each basic layer and the extended layer do not form a pair, the access unit of the extended layer whose DTS comes immediately after AU_b is searched and the access unit is decided as AU_e. That is, it is possible to determine the DTS based on information indicating an absolute value of the DTS of a head sample of the RAU of the extended layer in the decoding order.

In addition, a DTS is determined according to whether the RAUs of the basic layer and the extended layer form a pair or do not form a pair. However, the above operation may be switched according to the information as long as the information indicates whether or not the both layers form a pair.

Further, when a decoding time of an access unit at a file head or a RAU head of the basic layer is not 0 (delta is not 0 and, for example, an absolute time such as start at 17:00:00 is indicated), a value of delta is additionally added to determine a DTS. Alternatively, a value obtained by adding the decoding time offset and delta may be indicated as decoding time offset information.

When the number of layers is three or more (there are two types of the extended layers or more), information used to identify the different extended layers from each other may be stored to select and determine the extended layer to decode upon reproduction. In this case, the decoding time offset information is set per different extended layer.

When start deciding unit 22 of receiving device 20 decides that processing is not the processing of the access unit which starts being decoded (No in S22), subsequent DTS determinator 24 of receiving device 20 adds a difference (relative time) between DTSs of a current access unit and a last access unit, to the DTS of the last access unit in the decoding order (S24).

In addition, offset reflector 23 and subsequent DTS determinator 24 obtain header information of MP4 (e.g. 'stbl' of 'trak' or 'trun' of 'traf') which is necessary to calculate the DTS based on an input which is not illustrated.

(RAU of Extended Layer)

In this regard, definitions of each RAP and each RAU of each extended layer will be described in detail.

Each extended layer is decoded by referring to a decoding result of the basic layer, and therefore it is not possible to decode each extended layer alone. Hence, when each extended layer alone is taken into account, there is no RAP. However, to efficiently search for an access unit of the extended layer corresponding to a RAP of the basic layer upon an random access to content, a RAP and a RAU are desirably defined for each extend layer, too.

The RAU of each extended layer can be defined as follow. In addition, the RAP is a head access unit of the RAU in the decoding order. That is, a RAUe of each extended layer is a unit which forms a pair with a RAUb of the basic layer. Further, the RAUe of the extended layer is a unit used as the RAP of the basic layer such as Movie Fragment according to MP4, an MPU according to MMT or a segment according to DASH.

Furthermore, the head access unit of the RAU of the extended layer in the decoding order may not be an access unit (sync sample according to MP4) such as a picture I or a picture IDR which can be independently decoded. Still further, information indicating sync sample may not be set.

Moreover, upon reproduction in the receiving device, a reference to RAU information of each extended layer is made to search for the access unit of each extended layer corresponding to the access unit of the basic layer which starts being decoded. For example, a DTS of a head access unit per RAU is searched for.

When searching for the RAU of each extended layer, the receiving device may perform an operation assuming that Movie Fragment or an MPU corresponds to the RAU. Information indicating a unit of the RAU of each extended layer may be stored in a track of each extended layer or an MP4 file including the track of each extended layer. When the RAU of each extended layer is searched for, whether or not the head access unit of the RAU is sync sample is ignored. Alternatively, without storing information of each extended layer for making a random access, after a random access point of the basic layer is determined, an operation may be performed to start decoding an MPU of each extended layer having the same sequence number as a sequence number of the MPU of the basic layer which is the random access point.

Alternatively, each extended layer may be regarded such that the RAP of each extended layer corresponds to sync sample. In this case, in a table of access units such as 'stss' or 'mfra' of MP4 data to which a random access can be made, the RAP of each extended layer may be indicated. The receiving device can search for each RAP based on these tables. Further, according to Movie Fragment, flag information indicating whether or not a head sample is sync sample may be set in 'traf', and the receiving device may search for each RAP according to whether or not a sample is sync sample.

The above applies likewise even when a RAU is defined according to MPEG-2 TS.

(Others)

That MP4 data includes an access unit of each extended layer may be signaled in a higher layer than a layer of MP4 data such as data in MP4, a PMT according to MPEG-2 TS or content management information. The data in MP4 is, for example, a brand of an MP4 file or 'mmpu' in the case of an MPU according to MMT.

In content distribution which uses broadcast and communication in combination, the basic layer may be transmitted by way of broadcasting and each extended layer may be transmitted through a communication network. That is, the generating step of the transmitting method may include generating a first encoded stream including the basic layer (first set) according to MPEG-2 TS, and generating a second encoded stream including each extended layer (second set) according to MMT. Further, a transmitting step may include transmitting the first encoded stream by using a channel used for broadcasting, and transmitting the second encoded stream by using a channel used for communication. In addition, the first encoded stream and the second encoded stream may be generated according to a method opposite to the above method. Further, in this case, the first encoded stream and the second encoded stream are transmitted by using channels opposite to the channels used in the transmitting step.

Further, in a PMT (Program Map Table) for broadcasting, information which is necessary to obtain encoded data of each extended layer such as a URL of a transmission source server of encoded data of the extended layer, an access destination file name or an access method (HTTP GET in the case of download or a command of RTSP (Real Time Streaming Protocol) in the case of streaming). A method for storing, in the PMT, information indicating a data access destination which is configuration data of the same content and is transmitted from a different channel from the channel for broadcast, and an access method is not limited to the example of each basic layer and the extended layer, and is widely applicable to a combination of video data and audio data.

(Method for Transmitting Items of Encoded Data of Basic Layer and Extended Layer in Decoding Order)

When items of encoded data of the basic layer and each extended layer are transmitted as one encoded stream, it is possible to transmit the items of encoded data of both of the layers in the decoding order. In addition, this method is applicable not only to transmission but also to storage.

Figure 14:
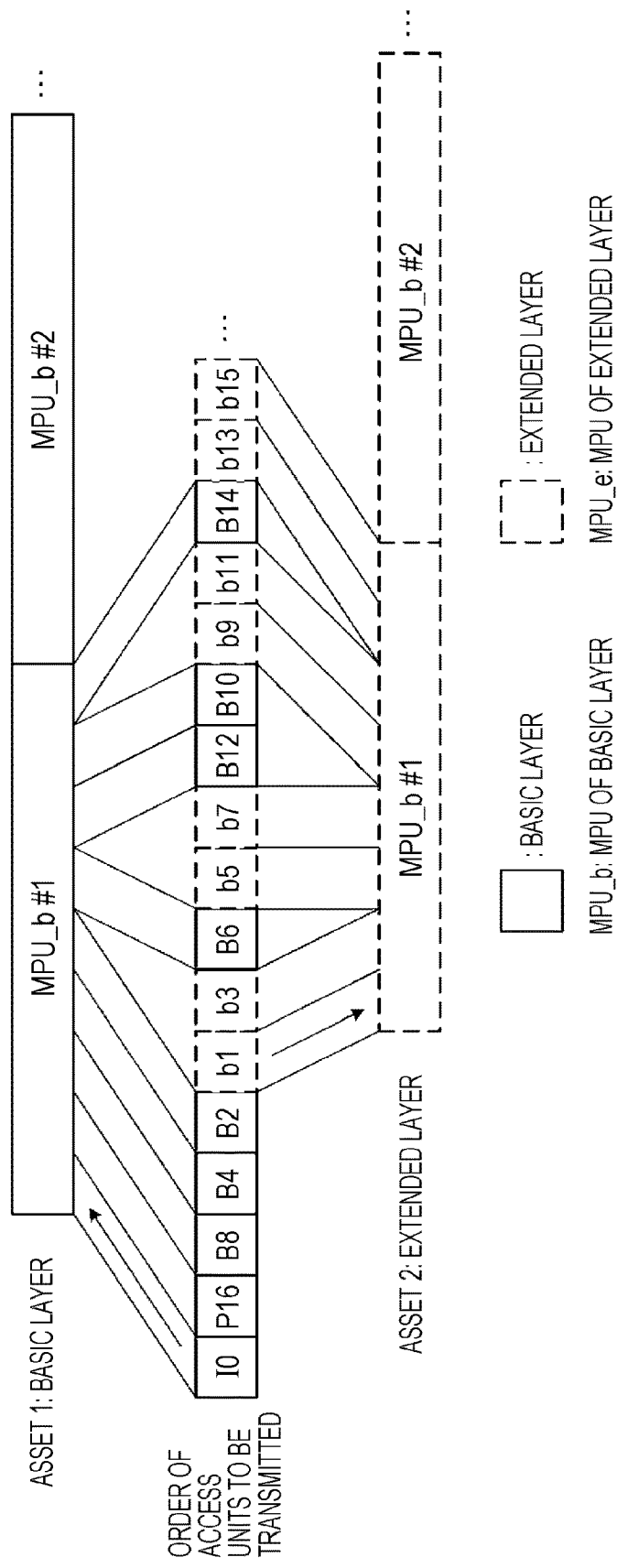
FIG. 14 is a view illustrating an example where the encoded data in FIG. 1 is multiplexed according to MMT.

FIG. 14 is a view illustrating an example where the encoded data in FIG. 1 is multiplexed according to MMT. The basic layer is stored in asset 1 and each extended layer is stored in asset 2, and asset 1 includes an MPU_b and asset 2 includes an MPU_e.

According to MMT, an MPU of each asset is converted into a packet such as an MMT packet or an RTP (Ream-time Transport Protocol) packet and is transmitted. In this case, the MPU is converted into a packet to arrange the items of encoded data of the basic layer and the extended layer stored in a payload of the packet in the decoding order. A center line in FIG. 14 indicates an order of items of data stored in the payload of the packet when the MPU_b and the MPU_e are converted into a packet and are transmitted, and matches with the decoding order of the items of encoded data.

Thus, by arranging the items of encoded data of the both layers in the decoding order to transmit the items of encoded data of the basic layer and each extended layer as one encoded stream, the receiving device can obtain data of a corresponding access unit of the extended layer by starting decoding RAPs from a RAP of the basic layer in order. Consequently, it is not necessary to perform an operation of rearranging items of encoded data of the basic layer and each extended layer in the decoding order, and reduce a processing load of the receiving device.

According to a coding method such as MPEG-4 AVC or HEVC, the decoding order and the presentation order can be obtained from items of encoded data. Consequently, in the case of a fixed frame rate, it is possible to determine a DTS and a PTS of the access unit of each extended layer based on a DTS, a PTS and a frame rate of the basic layer. In this case, decoding time offset information of each extended layer may not be signaled (Data Receiving Method for Receiving Encoded Data of Basic Layer and Extended Layer in Decoding Order)

A receiving method for receiving streams transmitted by the transmitting method described with reference to FIG. 14 will be described.

Figure 15:
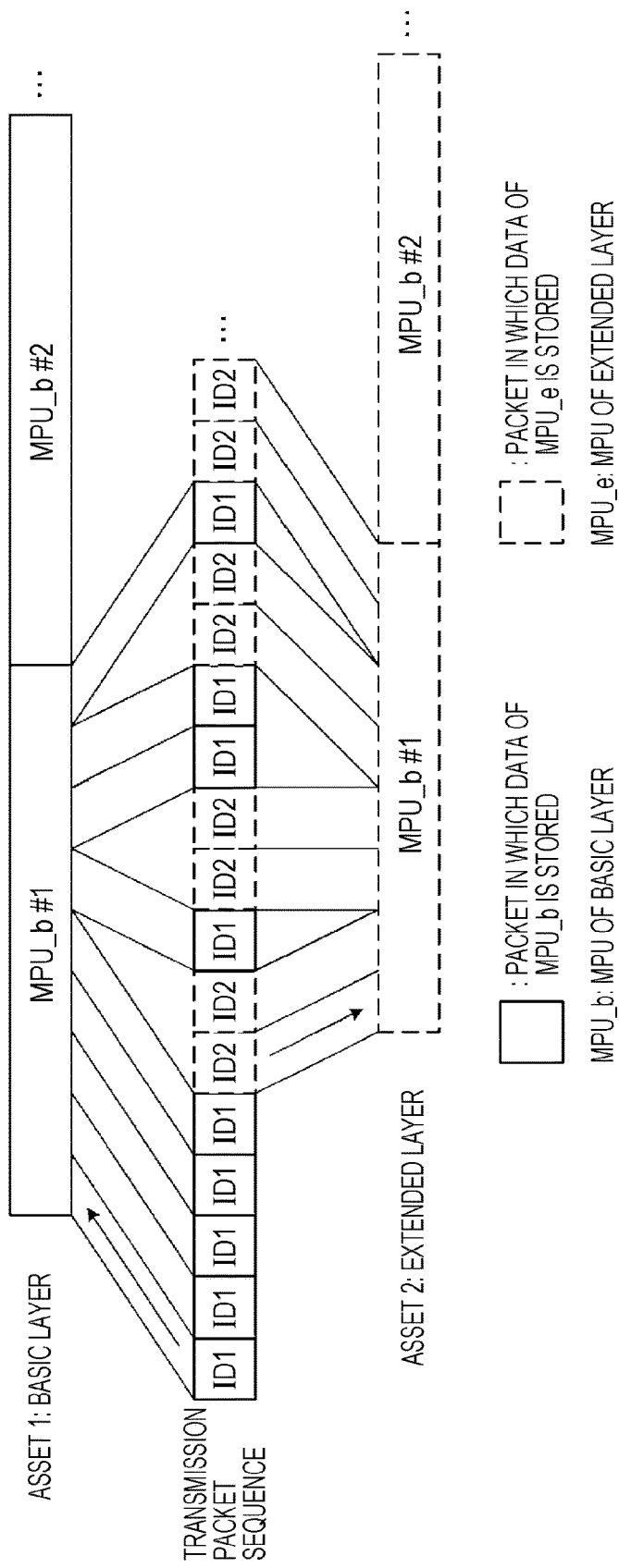
FIG. 15 is a view illustrating an example of a transmission packet sequence obtained when the items of encoded data of the basic layer and the extended layer are converted into one encoded stream (packet sequence)

FIG. 15 is a view illustrating an example of a transmission packet sequence obtained when the items of encoded data of the basic layer and each extended layer are converted into one encoded stream (packet sequence). As illustrated in FIG. 15, MPUs of the basic layer and each extended layer which are encoded streams to be transmitted (encoded streams received by the receiving device) are converted into packets in a transmission packet sequence. A packet in which the encoded data of the basic layer is stored and a packet in which the encoded data of the extended layer is stored are distinguished based on identification information stored in a packet header. For the identification information, packet_id can be used in the case of an MMT packet, PID can be used in the case of a TS packet and SSID can be used in the case of an RTP packet. When an MPU is converted into a packet according to a method other than the MMT packet, for example, it is possible to define a TS packet sequence as an MPU, and store the MPU in a TS payload. Further, the payload may not be the MPU, and, in the case of the TS packet, a packet obtained by converting encoded data into a PES packet may be stored in a TS payload.

Further, the both layers do not need to be transmitted in the same packet format, and may be converted into packets in different formats such as the TS packet for the basic layer and the MMT packet for each extended layer.

Further, according to DASH, segments of the basic layer and each extended layer may be classified, and items of data of access units of both segments may be stored in the decoding order.

The number of layers may be three or more (e.g. the basic layer and the two extended layers), and, even in this case, items of encoded data of all layers are transmitted in the decoding order.

Figure 16:
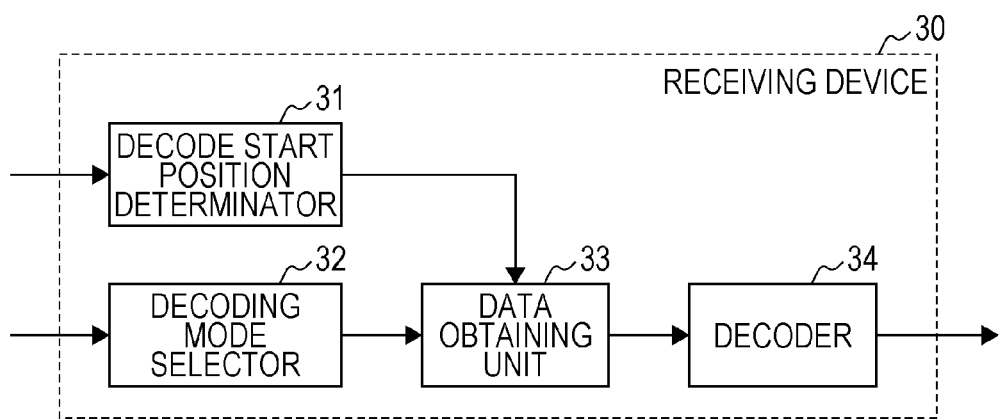
FIG. 16 is a block diagram illustrating another example of a configuration of the receiving device.
Figure 17:
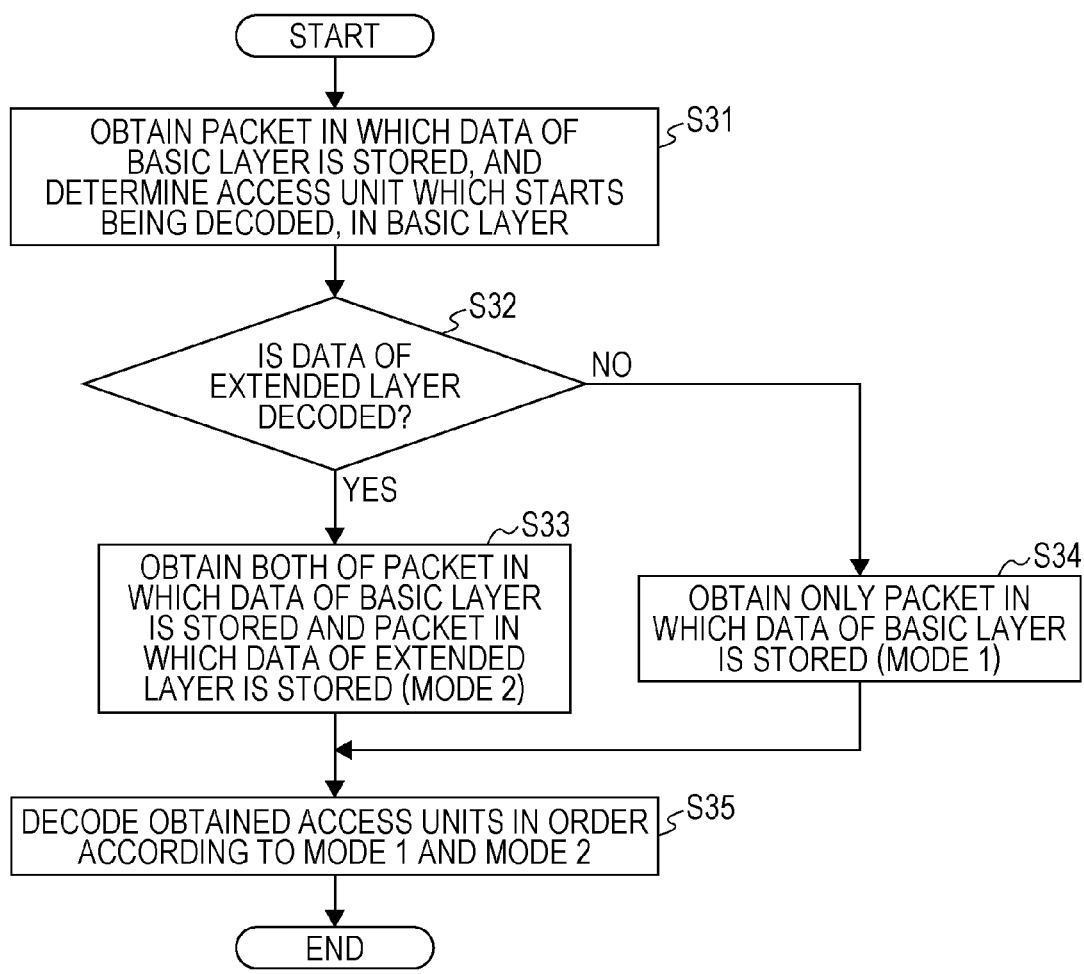
FIG. 17 is a flowchart indicating a receiving method for receiving the items of encoded data of the basic layer and each extended layer.

FIG. 16 is a block diagram illustrating another example of a configuration of the receiving device according. FIG. 17 is a flowchart indicating a receiving method for receiving the items of encoded data of the basic layer and each extended layer.

As illustrated in FIG. 16, receiving device 30 includes decode start position determinator 31, decoding mode selector 32, data obtaining unit 33 and decoder 34. In addition, more specifically, components of receiving device 30 are realized by a microcomputer, a processor or a dedicated circuit.

First, decode start position determinator 31 of receiving device 30 obtains a packet in which encoded data of the basic layer is stored, and determines an access unit of the basic layer which starts being decoded (S31). In this case, decode start position determinator 31 obtains at least the packet of the basic layer based on additionally obtained identification information of the packet and determines the access unit which starts being decoded based on a random access point of the basic layer.

Next, decoding mode selector 32 of receiving device 30 decides whether or not to decode encoded data of each extended layer (S32).

When decoding mode selector 32 decides to decode the encoded data of each extended layer (Yes in S32), data obtaining unit 33 obtains both of the packet in which the encoded data of the basic layer is stored and the packet in which the encoded data of each extended layer is stored (S33: mode 2). In this regard, when, for example, a packet ID of the basic layer is 1 and a packet ID of each extended layer is 2, both of the packets whose packet IDs are 1 an 2 may be obtained. Alternatively, each of the ID packets may be separately filtered, and, when the packet ID is 2, a step of regarding the packet ID as 1, and handling the packet ID in the same way as the packet ID which is 1 may be provided. That is, in this case, only packets whose IDs are 1 are obtained.

In addition, identification information indicating whether or not the decoding order is an ascending order may be provided to control information (a PA table or an MP table) according to MMT or control information in the PMT according to MPEG-2 TS. Receiving device 30 may analyze the identification information, and may not perform processing of rearranging items of encoded data of the basic layer and each extended layer when the decoding order is the ascending order and may perform the rearrangement processing when the decoding order is not the ascending order.

When decoding mode selector 32 decides not to decode that the encoded data of each extended layer (Yes in S32), data obtaining unit 33 obtains only the packet in which the encoded data of the basic layer is stored (S34: mode 1).

Further, decoder 34 of receiving device 30 decodes access units obtained according to mode 1 and mode 2 in order (S35). In addition, even in the case of mode 2, the items of encoded data of both of the basic layer and each extended layer are arranged in the decoding order, and do not need to be rearranged. Further, decoded data is, for example, data of 60 fps in the case of mode 1 and is data of 120 fps in the case of mode 2, and is displayed (reproduced) according to scalability of each extended layer.

Modified Example 1

In addition, the most simplified receiving device and receiving method will be described.

Figure 18:
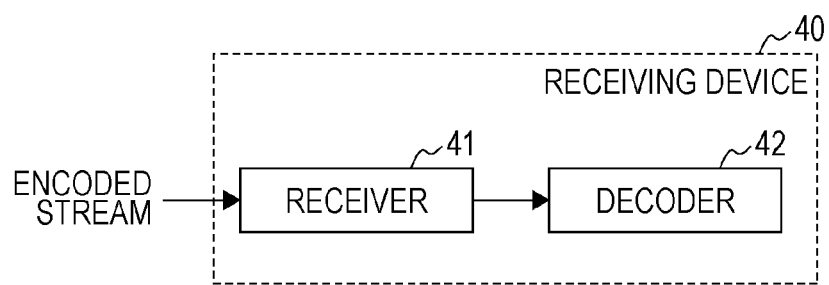
FIG. 18 is a block diagram illustrating another example of a configuration of the receiving device.
Figure 19:
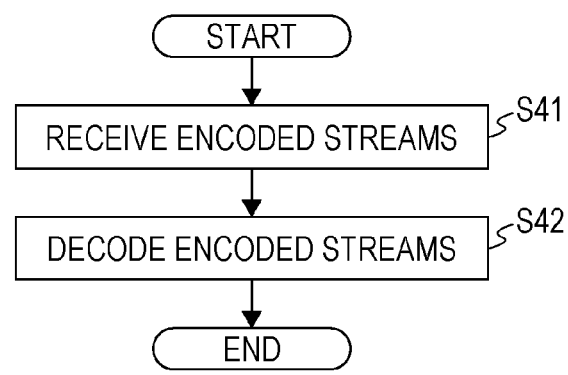
FIG. 19 is a flowchart of a receiving method.

FIG. 18 is a block diagram illustrating another example of a configuration of the receiving device according. FIG. 19 is a view illustrating a flowchart of a receiving method.

As illustrated in FIG. 18, receiving device 40 includes receiver 41 and decoder 42. In addition, more specifically, components of the receiving device are realized by a microcomputer, a processor or a dedicated circuit.

First, receiver 41 of receiving device 40 receives time information indicating a time at which processing of decoding encoded data is performed, and an encoded stream including the encoded data (S41).

Next, decoder 42 of receiving device 40 decodes the encoded data of the received encoded stream at a time indicated by the time information (S42).

In addition, the time information may indicate a time at which display processing is performed. In this case, a display which is not illustrated performs processing of displaying the data decoded by decoder 42 at a time indicated by the time information.

Modified Example 2

Further, an example of scalability in a time direction has been described above. However, the same method is applicable to scalability in a spatial direction when DTSs of a basic layer and an extended layer which configure an identical frame are different.

Modified Example 3

Further, an absolute value of a DTS of a head sample of the basic layer has been indicated in each of the above exemplary embodiments. However, the present disclosure is not limited to this, and an absolute value of a DTS may be determined by indicating an absolute value of a PTS of a head sample of the basic layer in a presentation order and obtaining a difference between the PTS and the DTS from header information of MP4. Further, the difference between the DTS and the PTS (i.e., a second relative time and a fourth relative time) is stored in the header information of MP4. Hence, instead of the absolute value of the DTS, the absolute value of the PTS may be indicated.

That is, in this case, first time information is information indicating a time at which a first access unit of a first set is displayed, and which is based on a reference clock. Further, second time information is information used to specify a time at which a second access unit of a second set is displayed, and which is based on a reference clock. Furthermore, each of a plurality of access units other than the first access unit of the first set may be associated with a fifth relative time which is based on a time indicated by the first time information. A time at which each of a plurality of access units of the first set is decoded is specified based on a sixth relative time which is based on a time at which each of a plurality of access units is displayed. Further, each of a plurality of access units other than the second access unit of the second set is associated with a seventh relative time which is based on a time indicated by the second time information. Furthermore, a time at which each of a plurality of access units of the second set is decoded is specified based on an eighth relative time which is based on a time at which each of a plurality of access units is displayed.

In addition, in each of the above exemplary embodiments, each component may be realized by being configured by dedicated hardware or executing a software program suitable to each component. Each component may be realized by causing a program executing unit such as a CPU or a processor to read and execute a software program recorded in a recording medium such as a hard disk or a semiconductor memory. In this regard, the software which realizes the transmitting device and the receiving device according to each of the above exemplary embodiments is a following program.

Further, this program is a transmitting method for causing a computer to transmit encoded data obtained by hierarchically encoding a video image into a basic layer and an extended layer, and includes: a generating step of generating an encoded stream including time information which indicates a time at which processing of decoding or displaying the encoded data is performed, and the encoded data; and a transmitting step of transmitting the generated encoded stream, and the encoded data includes a plurality of sets each including a plurality of access units, each of a plurality of access units which configure a first set that is the set of the basic layer among a plurality of sets can be independently decoded or can be decoded by referring to decoded data of another access unit of the basic layer, each of a plurality of access units which configure a second set that is the set of the extended layer among a plurality of sets can be decoded by referring to decoded data of the access unit of the basic layer, and the time information includes first time information which indicates a time at which the processing performed on a first access unit of the first set is performed and which is based on a reference clock, and second time information used to specify a time at which the processing performed on a second access unit of the second set is performed and which is based on the reference clock.

Further, this program is a receiving method for causing a computer to receive encoded data obtained by hierarchically encoding a video image into a basic layer and an extended layer, and includes: a receiving step of receiving an encoded stream including time information which indicates a time at which processing of decoding or displaying the encoded data is performed, and the encoded data; and a processing step of performing the processing on the encoded data of the received encoded stream at a time indicated by the time information, and the encoded data includes a plurality of sets each including a plurality of access units, each of a plurality of access units which configure a first set that is the set of the basic layer among a plurality of sets can be independently decoded or can be decoded by referring to decoded data of another access unit of the basic layer, each of a plurality of access units which configure a second set that is the set of the extended layer among a plurality of sets can be decoded by referring to decoded data of the access unit of the basic layer, and the time information includes first time information which indicates a time at which the processing performed on a first access unit of the first set is performed, and second time information used to specify a time at which the processing performed on a second access unit of the second set is performed.

Further, in the above exemplary embodiments, another processor may execute processing executed by a specific processor. Furthermore, an order of a plurality of processings may be changed, or a plurality of processings may be executed in parallel.

In addition, comprehensive or specific aspects of the present disclosure may be realized by a system, a method, an integrated circuit, a computer program or a recording medium such as a computer-readable CD-ROM. Further, comprehensive or specific aspects of the present disclosure may be realized by an arbitrary combination of the system, the method, the integrated circuit, the computer program and the recording medium.

The transmitting method and the receiving method according to one or a plurality of aspects of the present disclosure have been described above. However, the present disclosure is not limited to these exemplary embodiments. Aspects variously modified by one of ordinary skill in the art or aspects realized by combining components of different exemplary embodiments may also be included in one or a plurality of aspects of the present disclosure without departing from the spirit of the present disclosure.

The present disclosure is useful for the transmitting method and the receiving method which can specify a processing time of an access unit of the extended layer.

What is claimed is:

1. A transmitting method for transmitting encoded data obtained by hierarchically encoding a video image into a basic layer and an extended layer, the transmitting method comprising:
generating an encoded stream that includes time information and the encoded data, the time information indicating a time at which decoding or displaying processing of the encoded data is performed; and
transmitting the generated encoded stream,
wherein the encoded data includes a plurality of sets each including a plurality of access units,
each of the plurality of access units which configure at least one first set is independently decoded or is decoded by referring to decoded data of another access unit of the basic layer, the at least one first set being for a set of the basic layer among the plurality of sets,
each of the plurality of access units which configure at least one second set is decoded by referring to decoded data of an access unit of the basic layer, the at least one second set being a set for the extended layer among the plurality of sets
the time information includes first time information which indicates a time at which the processing performed on a first access unit of the first set is performed and which is based on a reference clock, and second time information used to specify a time at which the processing performed on a second access unit of the second set is performed and which is based on the reference clock,
the plurality of access units which configure the at least one second set is displayed at a frame rate higher than a frame rate for displaying only the plurality of access units which configure the at least one first set among the plurality of access units which configure the at least one first set and the plurality of access units which configure the at least one second set, by being displayed alternately with the plurality of access units which configure the at least one first set, and each of the plurality of access units which configure the at least one first set is decoded according to a first relative time based on the first time information by referring to the decoded data of the another access unit of the basic layer, the first relative time being a difference in decoding or displaying times of the access units.

2. The transmitting method according to claim 1, wherein the first access unit is an access unit of the first set on which the processing is performed first, and
the second access unit is an access unit of the second set on which the processing is performed first.

3. The transmitting method according to claim 2, wherein the processing is decoding,
each of the plurality of access units other than the first access unit of the first set is associated with the first relative time which is based on a time indicated by the first time information,
a time at which each of the plurality of access units of the first set is displayed is specified based on a second relative time which is based on a time at which each of the plurality of access units is decoded,
each of the plurality of access units other than the second access unit of the second set is associated with a third relative time which is based on a time indicated by the second time information, and a time at which each of the plurality of access units of the second set is displayed is specified based on a fourth relative time which is based on a time at which each of the plurality of access units is decoded.

4. The transmitting method according to claim 2, wherein the processing is displaying,
each of the plurality of access units other than the first access unit of the first set is associated with a fifth relative time which is based on a time indicated by the first time information,
a time at which each of the plurality of access units of the first set is decoded is specified based on a sixth relative time which is based on a time at which each of the plurality of access units is displayed,
each of the plurality of access units other than the second access unit of the second set is associated with a seventh relative time which is based on a time indicated by the second time information, and
a time at which each of the plurality of access units of the second set is decoded is specified based on an eighth relative time which is based on a time at which each of the plurality of access units is displayed.

5. The transmitting method according to claim 1, wherein the second time information is a time offset that is a difference value from a first absolute time indicated by the first time information.

6. The transmitting method according to claim 1, wherein
the first set is a random access unit to which a random access is made, and
the first access unit and the second access unit are random access points.

7. The transmitting method according to claim 6, wherein each of the at least one first set is associated with a corresponding one of the at least one second set.

8. The transmitting method according to claim 7, wherein the second sets is decoded by referring only to decoded data of the first sets associated with the second sets on the one-on-one basis.

9. The transmitting method according to claim 8, wherein each of the second sets further includes second header information in which identification information used to identify each of the first sets associated with the second sets on the one-on-one basis, and the second time information are stored.

10. The transmitting method according to claim 8, wherein each of the first sets further includes first header information in which identification information used to identify each of the second sets associated with the first sets on the one-on-one basis, and the second time information are stored.

11. The transmitting method according to claim 8, wherein
the encoded stream includes association information in which first identification information used to identify each of the first sets and second identification information used to identify each of the second sets associated with each of the first sets on the one-on-one basis are associated with each other, and
the second time information is stored in the association information.

12. The transmitting method according to claim 1, wherein the time information is stored in control information of the encoded stream.

13. The transmitting method according to claim 1, wherein the second time information indicates a second absolute time different from a first absolute time indicated by the first time information.

14. The transmitting method according to claim 1, wherein
the generating step includes generating a first encoded stream including the first set and a second encoded stream including the second set, and
the transmitting step includes transmitting the first encoded stream by using a first channel, and transmitting the second encoded stream by using a second channel different from the first channel.

15. The transmitting method according to claim 14, wherein the generating includes generating one of the first encoded stream and the second encoded stream according to MPEG-2 TS (Moving Picture Experts Group-2 Transport Stream), and
generating the other one of the first encoded stream and the second encoded stream according to MMT (MPEG Media Transport).

16. The transmitting method according to claim 14, wherein
one of the first channel and the second channel is a channel for broadcasting, and
the other one of the first channel and the second channel is a channel used for communication.

17. The transmitting method according to claim 1, wherein
the first time information includes a first display time at which a first basic access unit is displayed, and a second display time at which a second basic access unit to be displayed subsequently to the first basic access unit is displayed, the first basic access unit and the second basic access unit being included in the plurality of access units which configure the at least one first set, and
the second time information includes a third display time at which an extended access unit is displayed among extended access units which configure the at least one second set, the third display time being a time between the first display time and the second display time.

18. The transmitting method according to claim 1, wherein each of the plurality of access units which configure the at least one second set is decoded according to a second relative time based on the second time information by referring to the decoded data of the access unit of the basic layer.

19. The transmitting method according to claim 1, wherein the second time information used to specify the time at which the processing performed on the second access unit of the second set is performed is an absolute value or a difference value from the time indicated by the first time information.

20. A receiving method for receiving encoded data obtained by hierarchically encoding a video image into a basic layer and an extended layer, the receiving method comprising:
receiving an encoded stream including time information which indicates a time at which processing of decoding or displaying the encoded data is performed, and the encoded data; and
performing the processing on the encoded data of the received encoded stream at a time indicated by the time information,
wherein the encoded data includes a plurality of sets each including a plurality of access units,
each of the plurality of access units which configure a first set that is the set of the basic layer among the plurality of sets is independently decoded or is decoded by referring to decoded data of another access unit of the basic layer, each of the plurality of access units which configure a second set that is the set of the extended layer among the plurality of sets is decoded by referring to decoded data of the access unit of the basic layer, and the time information includes first time information which indicates a time at which the processing performed on a first access unit of the first set is performed, and second time information used to specify a time at which the processing performed on a second access unit of the second set is performed, the plurality of access units which configure the at least one second set is displayed at a frame rate higher than a frame rate for displaying only the plurality of access units which configure the at least one first set among the plurality of access units which configure the at least one first set and the plurality of access units which configure the at least one second set, by being displayed alternately with the plurality of access units which configure the at least one first set, and each of the plurality of access units which configure the at least one first set is decoded according to a first relative time based on the first time information by referring to the decoded data of the another access unit of the basic layer, the first relative time being a difference in decoding or displaying times of the access units.

21. The receiving method according to claim 20, wherein each of the plurality of access units which configure the at least one second set is decoded according to a second relative time based on the second time information by referring to the decoded data of the access unit of the basic layer.

22. The receiving method according to claim 20, wherein the second time information used to specify the time at which the processing performed on the second access unit of the second set is performed is an absolute value or a difference value from the time indicated by the first time information.

* * * * *